United States Patent
Pope et al.

(10) Patent No.: US 6,221,263 B1
(45) Date of Patent: Apr. 24, 2001

(54) TREATMENT SYSTEM FOR FIRE PROTECTION SPRINKLER SYSTEM

(76) Inventors: Daniel H. Pope, 30609 Berrycreek Dr., Georgetown, Williamson County, TX (US) 78626; Delbert Collinsworth, 207 N. Main St., Kouts, Porter County, IN (US) 46347

( * ) Notice: Subject to any disclaimer, the term of this patent is extended or adjusted under 35 U.S.C. 154(b) by 0 days.

(21) Appl. No.: 09/232,950

(22) Filed: Jan. 17, 1999

(51) Int. Cl.[7] .............................. A62C 35/60; C02F 1/68
(52) U.S. Cl. .......................... 210/764; 210/87; 210/90; 210/101; 210/198.1; 169/13
(58) Field of Search .................. 210/85, 87, 90, 210/198.1, 101, 764; 169/5, 13, 91, 14, 15, 16; 134/22.12, 22.14; 239/310

(56) References Cited

U.S. PATENT DOCUMENTS

| | | | |
|---|---|---|---|
| 434,392 | * | 8/1890 | Hyatt ..................................... 210/101 |
| 1,060,669 | * | 5/1913 | Darnall ................................. 261/34.1 |
| 1,405,411 | * | 2/1922 | Hamilton . | |
| 2,596,943 | * | 5/1952 | Sheen ..................................... 417/416 |
| 3,642,073 | * | 2/1972 | Livingston . | |
| 4,286,667 | * | 9/1981 | Westenhofer et al. . | |
| 5,174,383 | * | 12/1992 | Haugen et al. . | |
| 5,803,180 | * | 9/1998 | Talley . | |
| 6,076,536 | * | 6/2000 | Ludwig et al. . | |

* cited by examiner

*Primary Examiner*—Joseph W. Drodge
*Assistant Examiner*—Terry K. Cecil
(74) *Attorney, Agent, or Firm*—Domenica N. S. Hartman; Gary M. Hartman

(57) ABSTRACT

A device and method for automatically treating water as it enters a fire protection sprinkler system (FPS) to kill microbes introduced with the water. More particularly, the device is a treatment system that includes a storage tank 20 for chemicals prescribed to kill the microbes of concern, means for injecting the chemicals into the FPS, a pump 18 capable of delivering the proper amount of chemicals to the FPS, valving to isolate the pump and tank and prevent backflow from the FPS, and a flow or pressure switch 16 to activate the pump when water enters the FPS from an outside source. Substantially all water entering the system, for example through fire pump 12 and jockey pump 14, is treated in order to prevent or control deposition and microbiologically-influenced corrosion.

15 Claims, 1 Drawing Sheet

TREATMENT SYSTEM FOR FIRE PROTECTION SPRINKLER SYSTEM

BACKGROUND OF THE INVENTION

1. Field of the Invention

The present invention generally relates to the treatment of water within fire protection systems to kill microbes that promote corrosion within such systems.

2. Description of the Prior Art

It has been determined that microbes present in the water within a fire protection sprinkler system (FPS) can promote corrosion within the FPS by a mechanism that has been termed microbiologically-influenced corrosion (MIC). In the past, the treatment of water within an FPS required treating the water during initial filling of the FPS, and then maintaining appropriate treatment levels by occasionally testing the system for microbes and manually adding additional treatment chemicals as necessary.

SUMMARY OF THE INVENTION

As those skilled in the art are aware, other than during filling, the water within an FPS is relatively stagnant. However, small amounts of water periodically enter the FPS due to usage, leakage, and pressure increases in the water supply (which notably occurs at night as city water pressure typically rises due to lower usage). Therefore, while an FPS may be adequately treated with a treatment chemical to kill microbes when the FPS is initially filled, the inevitable addition of small amounts of water to the FPS introduces microbes. This invention is based in part on the determination that, left untreated, microbes introduced in this manner will lead to MIC and eventual damage to the FPS.

Accordingly, the invention is a device that is capable of automatically treating water as it enters a fire protection sprinkler system (FPS) to kill microbes introduced with the water. More particularly, this invention is a treatment system that includes a storage tank for chemicals prescribed to kill the microbes of concern, means for injecting the chemicals into an FPS, a pump capable of delivering the proper amount of chemicals to the FPS, valving to isolate the pump and tank and prevent backflow from the FPS, and a flow switch to activate the pump when water enters the FPS from an outside source.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
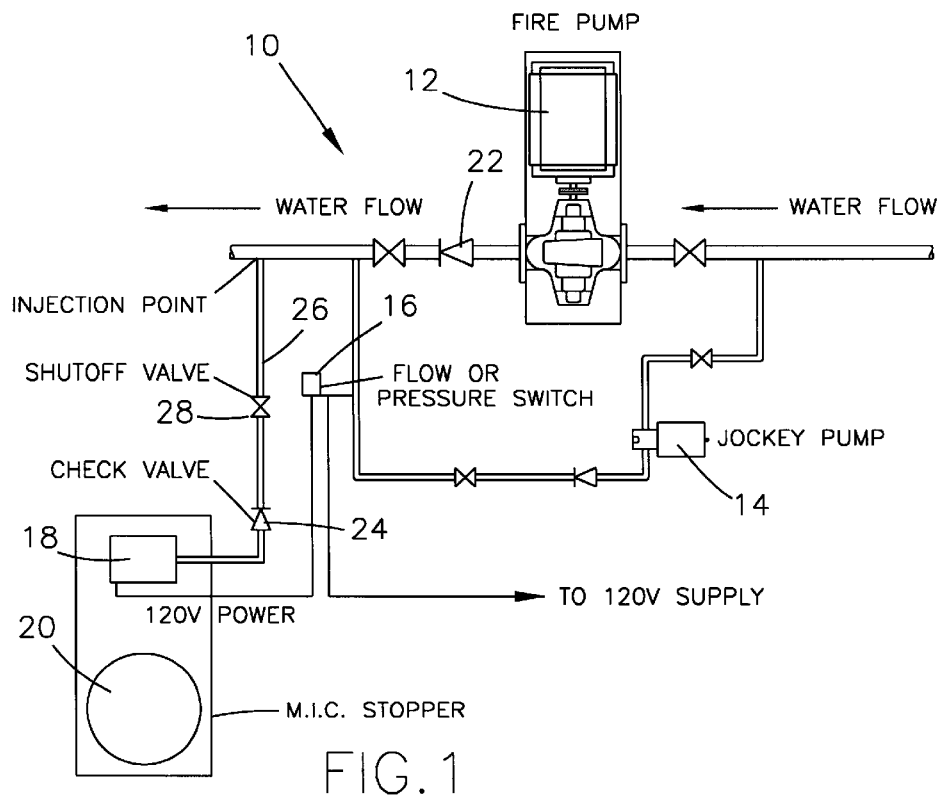
FIGS. 1 and 2 represent two embodiments for treatment systems in accordance with the present invention.
Figure 2:
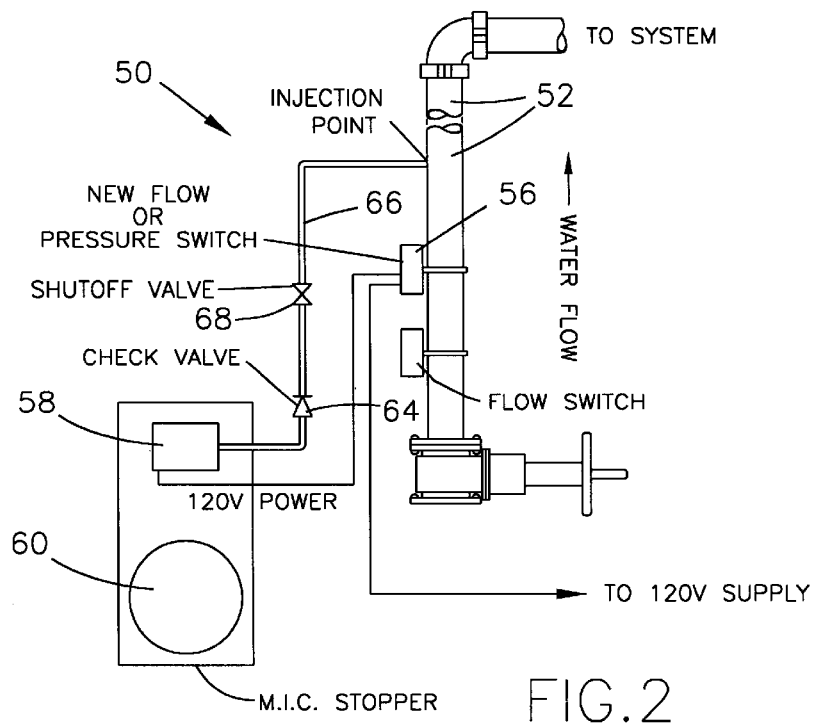

FIG. 1 schematically represents a treatment system 10 installed at a main fire pump 12 of an FPS, and FIG. 2 schematically represents a treatment system 50 installed at a riser 52 of an FPS. As is known in the art, the fire pump 12 and riser 52 are of a conventional type designed to deliver water to an FPS that includes sprinklers or other suitable nozzles, through which the water is discharged if a fire occurs in the structure in which the FPS is installed. The design and operation of an FPS are well known to those skilled in the art, and will not be discussed in any detail here.

The purpose of the treatment systems 10 and 50 is to automatically deliver treatment chemicals to water entering an FPS so that microbes that would promote MIC within the FPS are killed. More particularly, the treatment systems 10 and 50 of this invention are adapted to introduce microbe-killing chemicals into an FPS in an amount roughly proportional to the amount of water entering the system. Accordingly, the treatment systems 10 and 50 deliver treatment chemicals not only as the FPS is filled using city water pressure, a main fire pump 12 (FIG. 1), or any other method, but also as it enters the FPS due to the operation of a jockey pump 14 (FIG. 1) or any other pressure-maintaining device installed in an FPS. In short, the FPS treatment systems 10 and 50 are designed to treat all water entering any FPS components to prevent or control microbial colonization, fouling, deposit-formation, MIC and other corrosion, scaling or other deleterious mechanisms in the FPS. Various types of liquid disinfection chemicals can be dispensed with the treatment systems 10 and 50 of this invention, as well as other treatment chemicals, including but not limited to corrosion inhibitors, scalants, antiscalants, pH modifiers, oxygen scavengers, etc., into all water entering the FPS.

Accurate delivery of the desired chemicals to the FPS is achieved by detecting flow of water into the FPS with one or more pressure or flow switches 16 (FIG. 1) and 56 (FIG. 2) in piping entering or exiting the main fire pump 12 or jockey pump 14 of FIG. 1, or in the FPS piping such as the riser 52 of FIG. 2. Any water flow, as detected by the flow switches 16 and 56, (or any water flow initiated as a result of a pressure drop that can be detected by pressure switches) causes a switch controlling electrical power to an electric chemical feed pump 18 (FIG. 1) or 58 (FIG. 2) to activate (turn on), causing the pump 18 or 58 to deliver disinfectants and/or other chemical treatments from a storage tank 20 (FIG. 1) or 60 (FIG. 2) to the FPS. Injection of the disinfectant chemicals and other treatment chemicals (as desired) can be made to the discharge side of the main fire pump 12 and jockey pump 14 as shown in FIG. 1, or to the suction side of the main fire pump 12 and jockey pump 14, the jockey pump 14 only, or any other piping (e.g., riser 52 of FIG. 2) leading to the FPS, or any of its components which serve to treat water entering the FPS or any portion thereof. Once water flow into the FPS ceases, the flow (or pressure) switches 16 and 56 deactivate the pump 18 or 58, thereby ceasing the delivery of the chemical treatment to the FPS.

Variable-speed pumps suitable for use as the pumps 18 and 58 of this invention are known and commercially available. The pumps 18 and 58 must generally be capable of delivering both relatively large and small quantities of chemicals, corresponding to initial filling and subsequent introductions, respectively, of water into the FPS. Variable speed pumps 18 and 58 are suitable if their capacities fulfil the flow rates required by the main fire pump 12 and jockey pump 14, which generally will require delivering the treatment chemicals at rates of from less than one gallon per minute (during operation of the jockey pump 14) up to several gallons per minute (during operation of the main fire pump 12. One-way (check) valves 24 (FIG. 1) and 64 (FIG. 2) are incorporated into the tubing 26 (FIG. 1) and 66 (FIG. 2) leading from the chemical storage tanks 20/60 to the injection pumps 18/58. Additional shut-off valves 28 (FIG. 1) and 68 (FIG. 2) are installed in the tubing 26/66 between the feed pump 18/58 and the FPS to allow the isolation of the treatment system 10/50 from the jockey pump 14, main fire pump 12 or FPS riser 52. This is to allow maintenance of the FPS treatment systems 10 and 50, replacement of system components, etc.

If installed to deliver treatment chemicals to the FPS on the discharge side of the fire or jockey pumps 12 and 14 as shown in FIG. 1, the pumps 18 and 58 can also be used to elevate and maintain the water pressure on the downstream side of a main FPS valve 22 (e.g., a back flow preventer or other such valve in the FPS piping around which the jockey pump 14 ordinarily pumps water) above the water pressure that normally causes the jockey pump 14 to be operated. This can greatly reduce the number of times that the jockey pump 14 is operated. In this mode of operation, the amount of treatment chemicals present in the treatment waters delivered by the pump 18/58 and used to maintain high pressure can be greatly reduced. This reduces the amount of water, oxygen and treatment chemicals delivered to the FPS. This in itself reduces the amount of generalized corrosion in the FPS which is ordinarily due to contact of the FPS components with waters containing oxygen or other possible corrodents (e.g., strong oxidants such as chlorine, hypochlorite, hydrogen peroxide, and iodine). Additionally, other treatment chemicals can be added to the treatment waters to reduce the levels of oxygen (oxygen scavengers) or other corrodents or to provide protection against generalized corrosion.

As an alternative to the single variable-speed pumps 18 and 58, multiple pumps could be used in each of the treatment systems 10 and 50 of this invention. In a two-pump configuration, a large-volume chemical feed pump would be manually or automatically activated by a flow switch that detects large volumes and velocities of water flowing to the FPS. This large chemical feed pump would be capable of delivering large volumes (e.g., up to several gallons per minute) of liquid treatment chemicals, including disinfectants, to water entering the FPS, and would operate only when large volumes of water are entering the FPS (e.g., during filling of the FPS or during an inspector's tests). The second pump would be configured to accurately deliver smaller amounts (e.g., less than one gallon per minute) of the chemicals to water entering the FPS. As with the variable speed pumps 18 and 58 of FIGS. 1 and 2, the smaller pump could be used to elevate and maintain the water pressure on the downstream side of the main FPS valve 22 if installed to deliver treatment solution to the FPS on the discharge side of the fire or jockey pumps 12 and 14 of FIG. 1.

The FPS treatment systems 10 and 50 are preferably mounted on skids (not shown), The pumps 18 and 58 and other electrical connections are hardwired to the building's electrical supply. Normally, these will use 115 V supply.

While the invention has been described in terms of a preferred embodiment, it is apparent that other forms could be adopted by one skilled in the art. Accordingly, it should be understood that the invention is not limited to the specific embodiments illustrated in the Figures. It should also be understood that the phraseology and terminology employed above are for the purpose of disclosing the illustrated embodiments, and do not necessarily serve as limitations to the scope of the invention. Instead, the scope of the invention is to be limited only by the following claims.

What is claimed is:

1. A device for automatically treating a fluid as it is intermittently introduced from a fluid source into a substantially stagnant and pressurized fire protection sprinkler system so as to prevent or control deposition and microbiologically-influenced corrosion caused by microbes present in the sprinkler system and introduced with the fluid into the sprinkler system by a means coupled to the sprinkler system for delivering fluid thereto from the fluid source, the fluid delivering means being operable to deliver a first portion of fluid to fill the sprinkler system and including a means operable to deliver a second portion of fluid to the sprinkler system if the pressure therein drops below a predetermined pressure level, the device comprising:

means for storing at least one chemical capable of killing the microbes;

means for detecting substantially any introduction of the fluid by the fluid delivering means into the sprinkler system from the fluid source; and means for delivering the at least one chemical to the sprinkler system, the chemical delivering means being coupled to the detecting means so that the detecting means activates the chemical delivering means in response to the introduction of substantially any fluid into the sprinkler system from the fluid delivering means so as to initiate delivery of the at least one chemical to the sprinkler system along with the first and second portions of fluid, and so that the detecting means deactivates the chemical delivering means in response to cessation of the introduction of the first or second portions of fluid into the sprinkler system so as to cease delivery of the at least one chemical to the sprinkler system.

2. A device according to claim 1, wherein the detecting means comprises a pressure switch operable to sense a pressure drop below a predetermined pressure level in the sprinkler system, the detecting means being operable to activate the chemical delivering means until the predetermined pressure level is reestablished in the sprinkler system, and to thereafter deactivate the chemical delivering means.

3. A device according to claim 1, wherein the detecting means comprises a flow meter operable to sense fluid flow into the sprinkler system from the fluid source, the detecting means being operable to activate the chemical delivering means until the fluid flow into the sprinkler system ceases, and to thereafter deactivate the chemical delivering means.

4. A device according to claim 1, wherein the chemical delivering means is a pump operable at variable delivery speeds.

5. A fire protection sprinkler system comprising:

a substantially stagnant pressurized sprinkler system into which water is intermittently introduced;

fluid delivering means coupled to the sprinkler system for delivering water thereto from a fluid source, the fluid delivering means being adapted to deliver a first portion of water to fill said sprinkler system and including a means adapted to deliver a second portion of water to the sprinkler system if the pressure therein drops below the pressure level of the fluid source; and a microbe treatment system for automatically treating water as it is introduced into the sprinkler system from the fluid delivering means, the microbe treatment system comprising:

a storage means, at least one chemical within the storage means, the at least one chemical being capable of killing microbes that cause deposition and microbiologically-influenced corrosion;

means for detecting substantially any introduction of water into the sprinkler system from the fluid delivering means; and means for delivering the at least one chemical to the sprinkler system, the chemical delivering means being coupled to the detecting means so that the detecting means activates the chemical delivering means in response to the introduction of substantially any water into the sprinkler system from the fluid delivering means so as to initiate delivery of the at least one chemical to the sprinkler system along with the first portion and said second portions of water, and so that the detecting means deactivates the chemical delivering means in response to cessation of the introduction of the first or second portions of water into the sprinkler system so as to cease delivery of the at least one chemical to the sprinkler system;

wherein the microbe treatment system prevents or controls microbial activity within the sprinkler system that would otherwise be caused by microbes introduced with the water into the sprinkler system from the fluid source.

6. A fire protection sprinkler system according to claim 5, wherein the detecting means comprises a pressure switch operable to detect a drop in pressure of the water within the sprinkler system below a predetermined pressure level and is further operable to activate the chemical delivering means until the predetermined pressure level is reestablished in the sprinkler system, and to thereafter deactivate the chemical delivering means.

7. A fire protection sprinkler system according to claim 5, wherein the detecting means comprises a flow switch operable to sense fluid flow into the sprinkler system from the fluid source and is further operable to activate the chemical delivering means until the fluid flow into the sprinkler system ceases, and to thereafter deactivate the chemical delivering means.

8. A fire protection sprinkler system according to claim 5, wherein the chemical delivering means is a pump operable at variable delivery speeds.

9. A method of automatically treating a fluid as it is intermittently introduced from a fluid source into a substantially stagnant pressurized fire protection system so as to prevent or control deposition and microbiologically-influenced corrosion caused by microbes introduced with the fluid into the sprinkler system by a means coupled to the sprinkler system for delivering fluid thereto from the fluid source, the fluid delivering means being operable to deliver a first portion of fluid to fill the sprinkler system and including a means operable to deliver a second portion of fluid to sprinkler system if the pressure therein drops below a predetermined pressure level, the method comprising the steps of:

storing at least one chemical capable of killing microbes;

detecting substantially any introduction of fluid into the sprinkler system from the fluid delivering means; and delivering the at least one chemical to the sprinkler system in response to the introduction of substantially any fluid into the sprinkler system from the fluid delivering means so as to initiate delivery of the at least one chemical to the sprinkler system along with the first portion and second portions of fluid, and ceasing delivery of the at least one chemical to the sprinkler system in response to cessation of the introduction of the first or second portions of fluid into the sprinkler system.

10. A method according to claim 9, wherein the detecting step comprises sensing a pressure drop below a predetermined pressure level in the sprinkler system, and the at least one chemical is delivered to the sprinkler system until the predetermined pressure level is reestablished in the sprinkler system by the fluid source.

11. A method according to claim 9, wherein the detecting step comprises sensing fluid flow into the sprinkler system from the fluid source, and the at least one chemical is delivered to the sprinkler system until the fluid flow from the fluid source into the sprinkler system ceases.

12. A method according to claim 9, wherein the delivering step is performed during filling of the sprinkler system from the fluid source, and during the addition of fluid into the sprinkler system when fluid flows from the fluid source into the sprinkler system as a result of a pressure drop of the fluid within the sprinkler system.

13. A method according to claim 9, wherein the at least one chemical further comprises at least a second chemical chosen from the group consisting of corrosion inhibitors, scalants, antiscalants, pH modifiers and oxygen scavengers.

14. A method according to claim 9, wherein the delivering step occurs while the pressure level within the sprinkler system is being increased with a jockey pump.

15. A method according to claim 9, wherein all fluid entering the sprinkler system from the fluid source is treated with the at least one chemical as the fluid enters the sprinkler system.

* * * * *

UNITED STATES PATENT AND TRADEMARK OFFICE
Certificate

Patent No. 6,221,263 B1                                                            Patented: April 24, 2001

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Daniel H. Pope, Georgetown, Williamson County, Texas.

Signed and Sealed this Twenty-sixth Day of February 2002.

<div style="text-align: right">
WANDA L. WALKER<br>
*Supervisory Patent Examiner*<br>
Art Unit 1723
</div>